US010130078B2

(12) United States Patent
Rust et al.

(10) Patent No.: US 10,130,078 B2
(45) Date of Patent: *Nov. 20, 2018

(54) AVIARY CAGE WITH EGG AND MANURE REMOVAL SYSTEM AND METHOD FOR CONSTRUCTING SAME

(71) Applicant: Rose Acre Farms, Inc., Seymour, IN (US)

(72) Inventors: Marcus Rust, Remington, IN (US); David Hurd, Rensselaer, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/071,160

(22) Filed: Nov. 4, 2013

(65) Prior Publication Data
US 2015/0122191 A1 May 7, 2015

(51) Int. Cl.
A01K 31/00 (2006.01)
A01K 31/16 (2006.01)
A01K 31/22 (2006.01)

(52) U.S. Cl.
CPC ............ A01K 31/165 (2013.01); A01K 31/22 (2013.01); Y10T 29/49826 (2015.01)

(58) Field of Classification Search
CPC ...... A01K 31/14; A01K 31/16; A01K 31/165; A01K 31/04; A01K 31/002; A01K 31/005; A01K 31/17
See application file for complete search history.

(56) References Cited

U.S. PATENT DOCUMENTS

| 838,851 | A | | 12/1906 | Dropeskey |
| 1,674,193 | A | | 6/1928 | Coltrin |
| 2,096,356 | A | * | 10/1937 | Fox ......................... A01K 31/17 |
| | | | | 119/336 |
| 2,257,734 | A | | 10/1941 | Cornell |
| 2,565,521 | A | | 8/1951 | Ratermann |
| 2,692,578 | A | | 10/1954 | Manning |
| 2,695,006 | A | | 11/1954 | Tellefson |

(Continued)

FOREIGN PATENT DOCUMENTS

| CH | 662244 A5 | 9/1987 |
| DE | 20317631 U1 | 4/2004 |

(Continued)

OTHER PUBLICATIONS

Big Dutchman, NATURA60 & NATURA70 The Modern aviaries for barn and free range egg production, product brochure, Mar. 2010.

(Continued)

Primary Examiner — Monica L Williams
Assistant Examiner — Michael A. Fabula
(74) Attorney, Agent, or Firm — Ice Miller LLP

(57) ABSTRACT

An aviary cage having a cage tower is provided. The cage tower includes a nesting area positioned in the cage tower and a belt extending below the nesting area. A scratching floor extends from the cage tower and is oriented with respect to the belt such that a deposit on the scratching floor is directed back to the belt. The belt is configured to capture eggs laid outside the nesting area. The belt is configured to capture a deposit. The belt may be further configured to remove dead animals from the aviary cage.

38 Claims, 11 Drawing Sheets

(56) References Cited

U.S. PATENT DOCUMENTS

| | | | | |
|---|---|---|---|---|
| 2,805,644 A * | 9/1957 | Lieberman | ............ | A01K 31/005 |
| | | | | 119/442 |
| 2,882,857 A * | 4/1959 | Ernst | ................ | A01K 31/17 |
| | | | | 119/475 |
| 2,956,539 A | 10/1960 | Boening | | |
| 2,970,567 A * | 2/1961 | Rubin | ................ | A01K 31/04 |
| | | | | 119/458 |
| 3,002,494 A * | 10/1961 | Murray | ................ | A01K 31/165 |
| | | | | 119/337 |
| 3,046,940 A * | 7/1962 | Kurtz | ................ | A01K 31/007 |
| | | | | 119/335 |
| 3,062,185 A | 11/1962 | Kurtz | | |
| 3,119,375 A * | 1/1964 | Ernst | ................ | A01K 31/17 |
| | | | | 119/337 |
| 3,124,101 A * | 3/1964 | Wierenga, Sr. | ........ | A01K 31/17 |
| | | | | 119/438 |
| 3,124,102 A * | 3/1964 | Kurtz et al. | ........... | A01K 31/16 |
| | | | | 119/337 |
| 3,134,358 A * | 5/1964 | Byrnes | ................ | A01K 1/035 |
| | | | | 119/458 |
| 3,139,065 A * | 6/1964 | Willauer, Jr. | ........ | A01K 31/16 |
| | | | | 119/337 |
| 3,164,129 A | 1/1965 | Rigterink | | |
| 3,208,430 A * | 9/1965 | Ernst | ................ | A01K 31/17 |
| | | | | 119/456 |
| 3,242,904 A * | 3/1966 | Rannou | ................ | A01K 31/007 |
| | | | | 119/337 |
| 3,274,973 A * | 9/1966 | Woods | ................ | A01K 1/015 |
| | | | | 119/164 |
| 3,312,194 A * | 4/1967 | Ernst | ................ | A01K 31/04 |
| | | | | 119/451 |
| 3,319,606 A * | 5/1967 | Virgil | ................ | A01K 31/04 |
| | | | | 119/337 |
| 3,339,528 A * | 9/1967 | Summerour | ........ | A01K 31/165 |
| | | | | 119/337 |
| 3,355,037 A | 11/1967 | Dodd | | |
| 3,464,389 A | 9/1969 | Seiderrman | | |
| 3,485,214 A * | 12/1969 | Burkholder | ........ | A01K 31/165 |
| | | | | 119/337 |
| 3,552,359 A * | 1/1971 | Graves | ................ | A01K 31/17 |
| | | | | 119/336 |
| 3,581,709 A * | 6/1971 | Van Huis | ................ | A01K 31/17 |
| | | | | 119/531 |
| 3,791,348 A * | 2/1974 | Marnett | ................ | A01K 1/0117 |
| | | | | 119/482 |
| 3,796,189 A * | 3/1974 | Blondeel | ................ | A01K 31/005 |
| | | | | 119/455 |
| 3,867,903 A * | 2/1975 | Fleshman | ................ | A01K 31/17 |
| | | | | 119/336 |
| 3,892,201 A * | 7/1975 | Crawford | ................ | A01K 31/04 |
| | | | | 119/479 |
| 3,976,032 A | 8/1976 | Ramser et al. | | |
| 3,978,819 A | 9/1976 | Lovitt | | |
| 4,008,690 A * | 2/1977 | Van Huis | ................ | A01K 45/005 |
| | | | | 119/455 |
| 4,011,837 A | 3/1977 | Ksioszk | | |
| 4,020,793 A * | 5/1977 | Morrison | ................ | A01K 31/002 |
| | | | | 119/453 |
| 4,023,531 A | 5/1977 | Thompson | | |
| 4,188,911 A | 2/1980 | Rafaely | | |
| 4,250,837 A | 2/1981 | Cocklereece | | |
| 4,315,481 A * | 2/1982 | Coile | ................ | A01K 31/22 |
| | | | | 119/437 |
| 4,321,887 A | 3/1982 | Martin et al. | | |
| 4,379,439 A | 4/1983 | Baur | | |
| 4,416,219 A | 11/1983 | Dill | | |
| 4,430,960 A * | 2/1984 | Nagel | ................ | A01K 31/22 |
| | | | | 119/439 |
| 4,437,433 A * | 3/1984 | Nijhof | ................ | A01K 31/007 |
| | | | | 119/455 |
| 4,474,137 A * | 10/1984 | Walters | ................ | A01K 31/005 |
| | | | | 119/458 |
| 4,480,588 A * | 11/1984 | Holladay | ............ | A01K 31/005 |
| | | | | 119/455 |
| 4,653,430 A * | 3/1987 | Mass | ................ | A01K 31/005 |
| | | | | 119/337 |
| 4,766,849 A * | 8/1988 | Kawabata | ............ | A01K 31/17 |
| | | | | 119/337 |
| 4,841,909 A | 6/1989 | Sciliano | | |
| 4,936,257 A * | 6/1990 | Kuhlmann | ................ | F26B 17/02 |
| | | | | 119/442 |
| 5,094,186 A * | 3/1992 | Andersen | ................ | A01K 31/16 |
| | | | | 119/337 |
| 5,174,242 A * | 12/1992 | Takeuchi | ................ | A01K 31/04 |
| | | | | 119/439 |
| 5,279,254 A | 1/1994 | Dowty | | |
| 5,570,657 A | 11/1996 | Kuhlmann | | |
| 5,596,949 A * | 1/1997 | Fanguy | ................ | A01K 31/005 |
| | | | | 119/458 |
| 5,662,068 A | 9/1997 | Childs | | |
| 5,666,905 A | 9/1997 | Mackin | | |
| 5,897,285 A | 4/1999 | Wanderscheid | | |
| 6,234,114 B1 * | 5/2001 | Dyer | ................ | A01K 31/16 |
| | | | | 119/334 |
| 6,286,456 B1 | 9/2001 | Michaelis | | |
| 6,394,031 B1 * | 5/2002 | Moller | ................ | A01K 31/16 |
| | | | | 119/335 |
| 6,412,439 B1 | 7/2002 | Otto-Lubker et al. | | |
| 6,598,562 B1 | 7/2003 | Dutkiewicz et al. | | |
| 6,688,835 B1 | 2/2004 | Buher | | |
| 6,968,807 B2 | 11/2005 | Kuhlmann | | |
| 7,350,364 B2 | 4/2008 | Meerpohl | | |
| 7,827,938 B2 | 11/2010 | Kuehlmann | | |
| 8,117,994 B1 | 2/2012 | Goodlow | | |
| 2004/0144326 A1 | 7/2004 | Smith | | |
| 2004/0144329 A1 | 7/2004 | Kuhlmann | | |
| 2008/0173250 A1 * | 7/2008 | Dowty | ................ | A01K 31/16 |
| | | | | 119/347 |
| 2009/0084323 A1 * | 4/2009 | Tsubai | ................ | A01K 31/17 |
| | | | | 119/336 |
| 2015/0122190 A1 | 5/2015 | Rust et al. | | |
| 2015/0122191 A1 | 5/2015 | Rust et al. | | |
| 2015/0122192 A1 | 5/2015 | Rust et al. | | |
| 2015/0122193 A1 | 5/2015 | Rust et al. | | |
| 2015/0122195 A1 | 5/2015 | Rust et al. | | |
| 2015/0126105 A1 | 5/2015 | Rust et al. | | |
| 2015/0230432 A1 | 8/2015 | Rust et al. | | |
| 2015/0230433 A1 * | 8/2015 | Dart | ................ | A01K 31/22 |
| | | | | 119/468 |

FOREIGN PATENT DOCUMENTS

| | | | | |
|---|---|---|---|---|
| EP | 0904690 A1 * | 3/1999 | ............ | A01K 31/16 |
| EP | 1477057 A1 | 11/2004 | | |
| EP | 2 878 195 A2 | 6/2015 | | |
| JP | 8172965 | 7/1996 | | |
| JP | 8172966 | 7/1996 | | |
| WO | WO 2016/062701 A1 | 4/2016 | | |

OTHER PUBLICATIONS

Agricultural Mfg. & Textiles, Inc., FingerBelt Laced With Fingers, Internet article, May 16, 2006, Agricultural Mfg. & Textiles, Inc.
Big Dutchman, Egg Production Photos, Internet article.
Big Dutchman, The Modem Aviary for Layers in Floor Management, Internet article, Sep. 12, 2012-Aug. 13, 2013.
Big Dutchman, NATURA70: Flexible, efficient and profitable, Internet article, Sep. 12, 2012-Aug. 13, 2013.
Big Dutchman, Group Laying Nest for Optimum Egg Quality, Internet article, Sep. 12, 2012-Aug. 13, 2013.
Poultry Times. Net, CSES Research Examines Worker Health, Internet newspaper article, Oct. 4, 2013.
Potters Poultry International, Aviary, product brochure.
Vencomatic Group, Bolegg Terrace, product brochure.
"Het etagesysteem voor leghennen; Ontwikkeling en toetsing van een volieresysteem voor leghennen" (1980-1987), Dec. 1, 1987 (Dec. 1, 1987), XP055195185.

(56) References Cited

OTHER PUBLICATIONS

Tiered Floor System for Laying Hens-development and testing of a henhouse system for laying hens (1980-1987), Dec. 1, 1987 (Dec. 1, 1987) XP055195185, English translation.
(EP141911765.8) European Patent Office, European Search Report, dated Jul. 1, 2015.
(EP141911765.8) European Patent Office, Written Opinion of the European Search Report, dated Jul. 1, 2015.
"Ein 2-Etagen-Lautstall Für Leghennen" Karl-Ludwig Borchert, Braunschweig-Völkenrode (1985), XP002065271.
"A 2-tier coop for laying hens" Karl-Ludwig Borchert, Braunschweig-Völkenrode (1985), XP002065271, English Translation.
"Alternatieve huisvesting voor leghennen" Ing. A. Cappon, C. ter Beek, W.F. Frederiks, and ir. J.A.M. Voermans (Jun. 1986), XP55194182.
"Alternative housing for laying hens" Ing. A. Cappon, C. ter Beek, W.F. Frederiks, and ir. J.A.M. Voermans (Jun. 1986), XP55194182, English Translation.
"Massive Investment in Scottish Barn Egg Production" The Poultry Site (Feb. 20, 2014).
TH.G.C.M. Fiks—Van Niekerk, B.F.J. Reuvekamp, R.A. Van Emous, M.A.W. Ruis, "Praktijk Rapport Pluimvee 6, Systeem van de toekomst voor leghennen", Praktijkonderzoek Veehouderij, Wageningen UR, Mar. 2003, Lelystad.
TH.G.C.M. Fiks—Van Niekerk, B.F.J. Reuvekamp, R.A. Van Emous, M.A.W. Ruis, "Research Report Poultry 6, System of the Future for Laying Hens", Institute for Animal Husbandry, Wageningen UR, Mar. 2003, Lelystad, English Translation.
First Examination Report, Systems and Methods for an Aviary, IP No. 701660, New Zealand Intellectual Property Office, Oct. 14, 2016.

\* cited by examiner

AVIARY CAGE WITH EGG AND MANURE REMOVAL SYSTEM AND METHOD FOR CONSTRUCTING SAME

TECHNICAL FIELD OF THE DISCLOSED EMBODIMENTS

The embodiments herein generally relate to aviary cages and, more particularly, to aviary cages having egg and manure removal systems.

BACKGROUND OF THE DISCLOSED EMBODIMENTS

Aviary cages are frequently used to house hens for egg production. Generally, the aviary cage includes nesting areas where the eggs are laid. The eggs are then carried from the nesting area to a collection area by an egg conveyor that is positioned adjacent the nesting area. Recently, the need to provide the hens with an area to walk around and peck and scratch has increased dramatically as more farms are producing "cage free" product. "Cage free" indicates that the hens are not confined within cages, and therefore, live a more normal life. Cage free products have been shown to have increased benefits for the consumer.

Unfortunately, along with the benefits of being cage free, providing open spaces for the hens also means that the hens are able to defecate in more areas. Hens may also die in the open spaces. Accordingly, it has become difficult to keep some aviaries clean from manure and deceased fowl. This has resulted in increased harmful ammonia contamination within some aviaries. It has also increased the requirements for manual cage cleaning. Some cages utilize belts to carry manure from the cage to a collection area. However, the belts are only capable of receiving manure that is disposed of in the general area of the belt. Because cage free aviaries frequently include vast amounts of open space, not all of the manure within the aviary and the aviary cage can be collected by the belt.

Additionally, the increased open space leads to the likelihood of some eggs being laid outside of the nesting area. These eggs remain unattended until an individual is able to enter the aviary or cage and remove the eggs. As such, many eggs are lost. Moreover, the eggs that are salvaged from the open spaces of the cage may have become contaminated with bacteria due to having been resting in manure for several days. Such eggs may not be sold for human consumption, which results in lower retail value for the producer.

SUMMARY OF THE DISCLOSED EMBODIMENTS

In one embodiment, an aviary cage is provided having a cage tower. The cage tower includes a nesting area positioned in the cage tower and a belt extending below the nesting area. A scratching floor extends from the cage tower and is oriented with respect to the belt such that a deposit on the scratching floor is directed back to the belt. The belt is configured to transport manure. The belt is configured to capture and transport eggs laid outside the nesting area. The belt is further configured to remove dead animals from the aviary cage.

In one embodiment, an aviary cage is provided. The aviary cage includes a nesting area and a belt extending below the nesting area. A scratching floor is oriented with respect to the belt such that a deposit on the scratching floor is directed back to the belt. The belt is configured to capture manure. The belt is configured to capture eggs laid outside the nesting area. The bolt is further configured to remove dead animals from the aviary cage.

In one embodiment, a method of constructing an aviary cage for manure, egg, and animal removal is provided. The method includes positioning a belt below a nesting area. A scratching floor is oriented with respect to the belt such that a deposit on the scratching floor is directed back to the belt. The belt is configured to capture eggs laid outside the nesting area. The belt is further configured to remove dead animals from the aviary cage.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
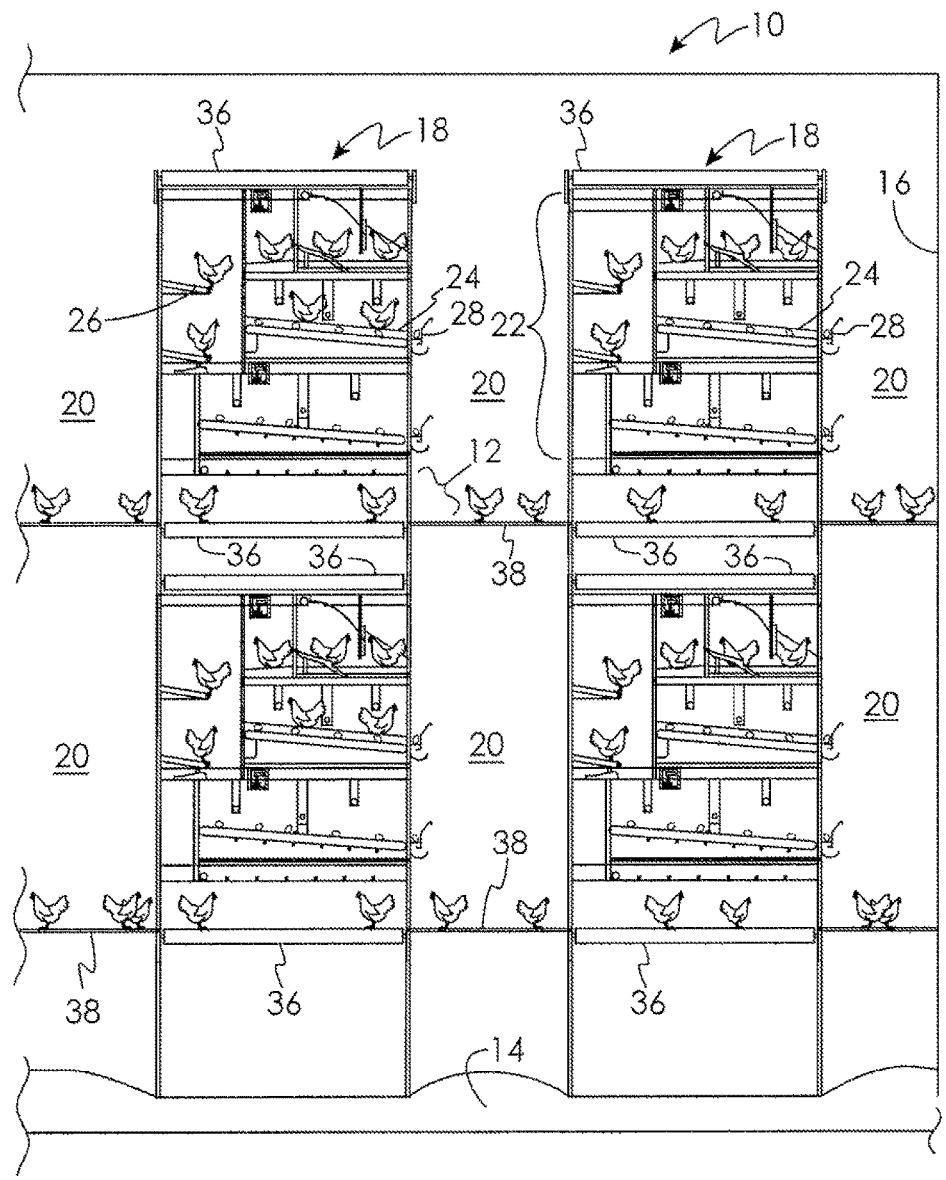
FIG. 1 is a front view of an aviary cage formed in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like-referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
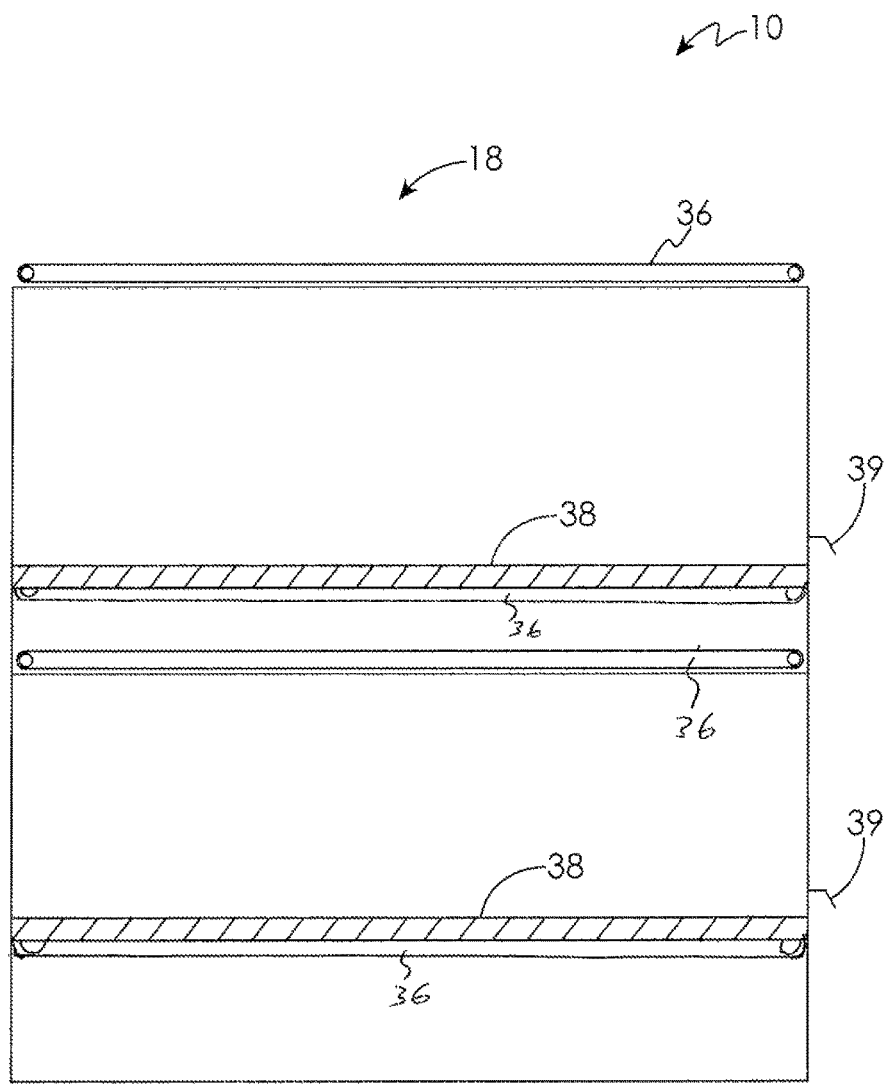
FIG. 2 is a side view of the aviary cage shown in FIG. 1 without the interior components of the cage towers.
Figure 3:
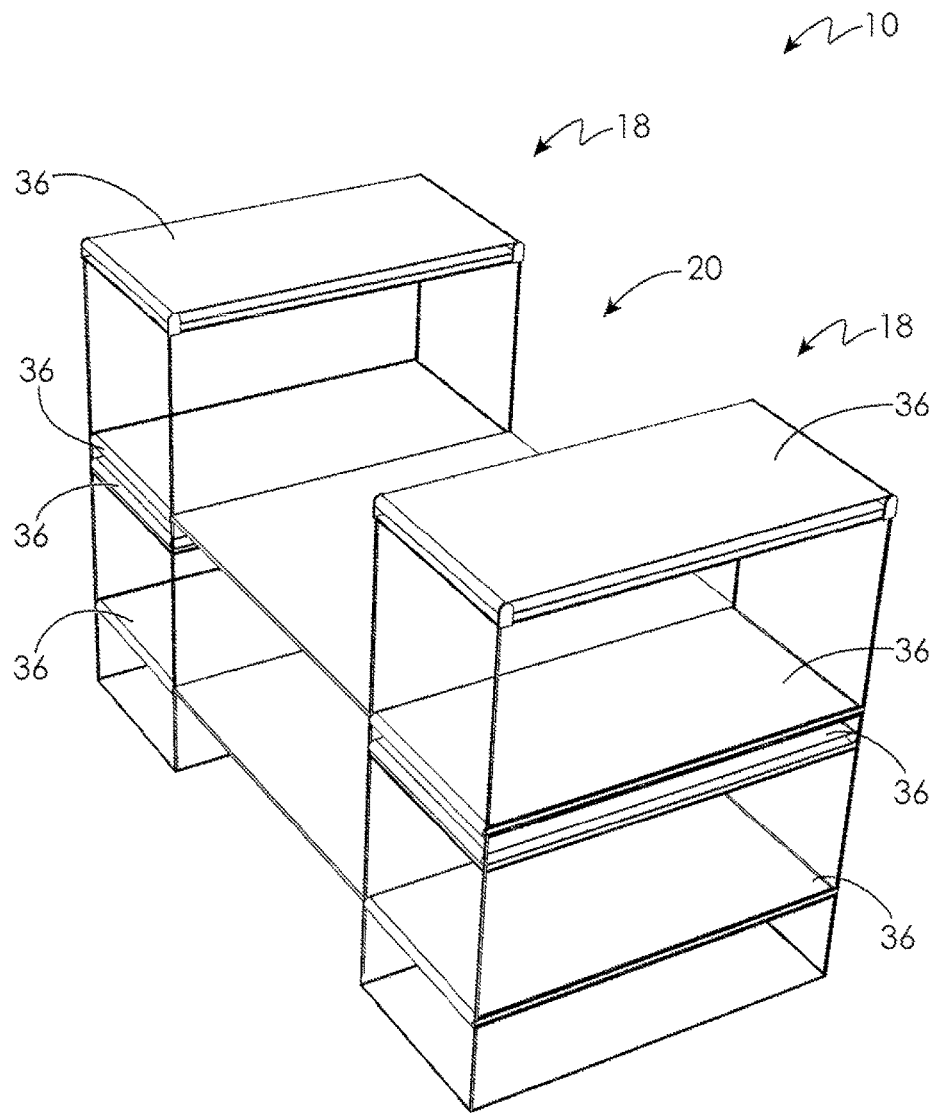
FIG. 3 is a top perspective view of the aviary cage shown in FIG. 1 without the interior components of the cage towers.

FIGS. 1-3 illustrate an aviary cage 10 configured with a manure removal system 12 according to one embodiment.

The aviary cage 10 may include a concrete floor 14 enclosed by exterior walls 16. The exterior walls 16 enclose at least two cage towers 18 where hens may be caged. Although the present embodiment illustrates only two towers 18, it should be noted that the aviary cage 10 may be constructed with any number of towers 18, including a single tower 18. An open space 20 extends between the two towers 18 to provide an inspection area. In an embodiment having more than two towers 18, an open space 20 may extend between each adjacent tower 18. In an embodiment having a single tower 18, an open space 20 is present on at least one side of the tower 18. Open space 20 may likewise be positioned between the end towers 18 and the respective exterior wall 16.

The open space 20 may include a floor serving as a pecking area where hens can move freely, peck the floor with their beaks, and scratch the floor with their feet. By permitting space for the hens to move freely, the aviary cage 10 satisfies the requirements to be considered "cage free" birds. See http://en.wikipedia.org/wiki/Cage-free. In other words, the hens are not continuously confined to a caged area.

Each tower 18 includes at least one nesting area 22. The nesting area 22, as illustrated, may include various sloped nesting platforms 24 where a hen may sit to lay eggs. The nesting platforms 24 may be joined by sloped platforms 26 that allow the hens to move freely up and down the tower 18 to a desirable nesting area 22. As the hens lay their eggs, the eggs are collected in egg conveyors 28 that extend along the sides of the nesting platforms 24. The egg conveyors 28 carry the eggs from the nesting area 22 to a collection area.

At least one belt 36 extends through the tower 18 below the nesting area 22 to remove a deposit from at least part of the tower 18. A deposit may include, but is not limited to, one or more items such as manure, an egg, litter, feathers, feed, or a dead bird. In one embodiment, the belt 36 extends through the tower 18 along the length of the tower 18. In one embodiment, the belt 36 extends approximately 400 feet along the length of the tower 18. In one embodiment, the belt 36 carries manure from the tower 18 to a collection area (not shown) positioned outside of the tower 18. By removing deposits, particularly manure, from at least part of the tower 18, ammonia levels within the cage 10 are significantly reduced. Additionally, the need for an individual to enter the cage 10 and clean the cage 10 by hand is greatly reduced. Accordingly, the present embodiments permit one person to care for 150,000 to 200,000 birds, compared with the 3-5 people per 150,000 to 200,000 birds required when known cages and aviaries are used. The present embodiments also eliminate the requirement for extreme body positions, including squatting for extended periods of time and crawling and laying on the floor while loading and unloading the cage and while gathering eggs from the cage. The present embodiments further reduce potential respiratory hazards and infection hazards to the workers. If a hen lays an egg outside of the nesting area 22, the egg will be collected by the belt 36 and carried to an egg collection area (not shown) positioned outside of the tower 18.

The present embodiments allow the removal of freshly laid eggs, which eggs may be sold under the label "cage free" because they were laid outside of a nest box environment. The present embodiments also prevent eggs from becoming contaminated due to slow retrieval thereof from the scratching areas or cage floor (during which time the eggs could be infiltrated by bacteria). Some embodiments permit automated removal of deceased birds.

In one embodiment, the belt 36 forms a floor of the tower 18. Accordingly, the birds are allowed to move freely and walk on the belt 36. In addition to collecting eggs and manure, the belt 36 may also remove dead birds from at least part of a tower 18. The illustrated embodiment includes a belt 36 positioned beneath each nesting area 22. In addition to the belts 36 positioned below the nesting area 22, a belt 36 is likewise positioned above each nesting area 22. The belts 36 above each nesting area 22 provide additional space for the hens to move freely. Deposits, which may include, but are not limited to, manure, eggs, litter, feathers, feed, or dead birds, within the cage 10 are collected on the belts 36.

Figure 11:
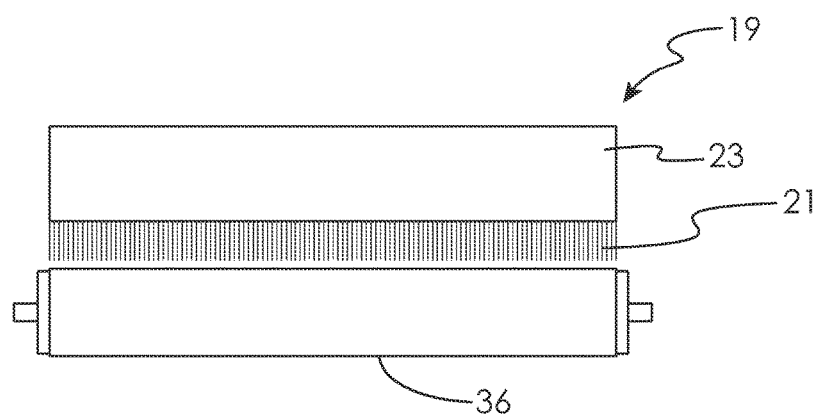
FIG. 11 is a front view a gate formed in accordance with an embodiment.
Figure 12:
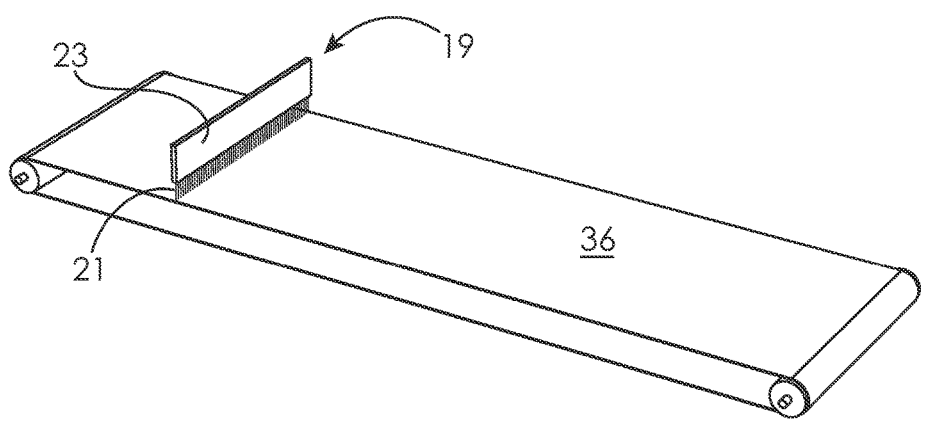
FIG. 12 is a side perspective view of the gate shown in FIG. 11.

In one embodiment, as illustrated in FIGS. 11 and 12, at least one gate 19 is positioned along each belt 36 to permit deposits on the belt 36 to pass thereunder and/or therethrough and to prevent birds from traveling beyond the gate. In the illustrated embodiment, the gate 19 includes plastic strips 21 extending downward from a solid partition 23. In the illustrated embodiment, the plastic strips 21 may be positioned approximately 1½ inches from the belt 36. If a deposit on the belt 36 in the illustrated embodiment is taller than the 1½ inch gap between the gate 19 and the belt 36, then the plastic strips 21 move when in contact with such a deposit to allow the deposit to pass therethrough. In an embodiment, the gate 19 may be positioned so that its lower edge is in contact with the belt 36. In an embodiment, the gate 19 may include a hinged door that moves to permit deposits larger than a gap between the hinged door and the belt 36 to pass thereunder. In an embodiment, the gate 19 may comprise one or more hinged doors to permit deposits larger than a gap between the hinged doors and the belt 36 to pass thereunder. In an embodiment, the gate 19 may comprise one or more swinging doors to permit deposits larger than a gap between the swinging doors and the belt 36 to pass thereunder. In an embodiment, an electric fence may be positioned on the gate 19 to prevent live birds from entering the gate 19. Alternately, an electric fence may be spaced apart from the gate 19 to prevent birds from reaching and entering the gate 19. In embodiments including at least one gate 19, birds are prevented from leaving a part of the aviary cage 10 while deposits are permitted to travel away from that part of the aviary cage 10.

In the illustrated embodiment, a scratching floor 38 extends from the tower 18. In some embodiments, the scratching floor is solid. In an embodiment having more than one tower 18, a scratching floor 38 may extend between any adjacent towers 18. Additionally, a scratching floor 38 may extend between the end towers 18 and the respective exterior wall 16. In an embodiment having more than two towers 18, a scratching floor may extend from adjacent towers 18 but not be continuous between adjacent towers 18.

Figure 4:
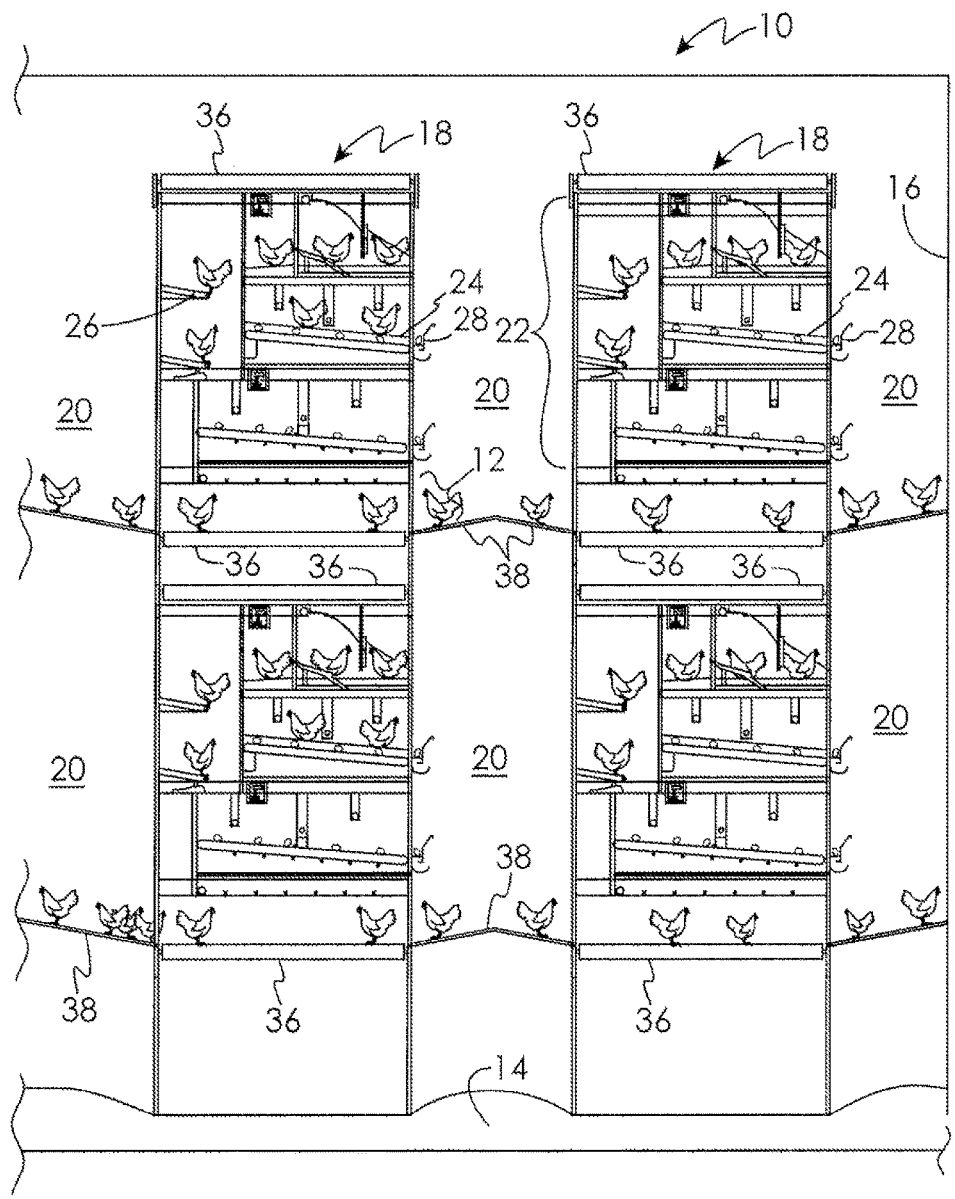
FIG. 4 is a front view of an aviary cage formed in accordance with another embodiment.
Figure 5:
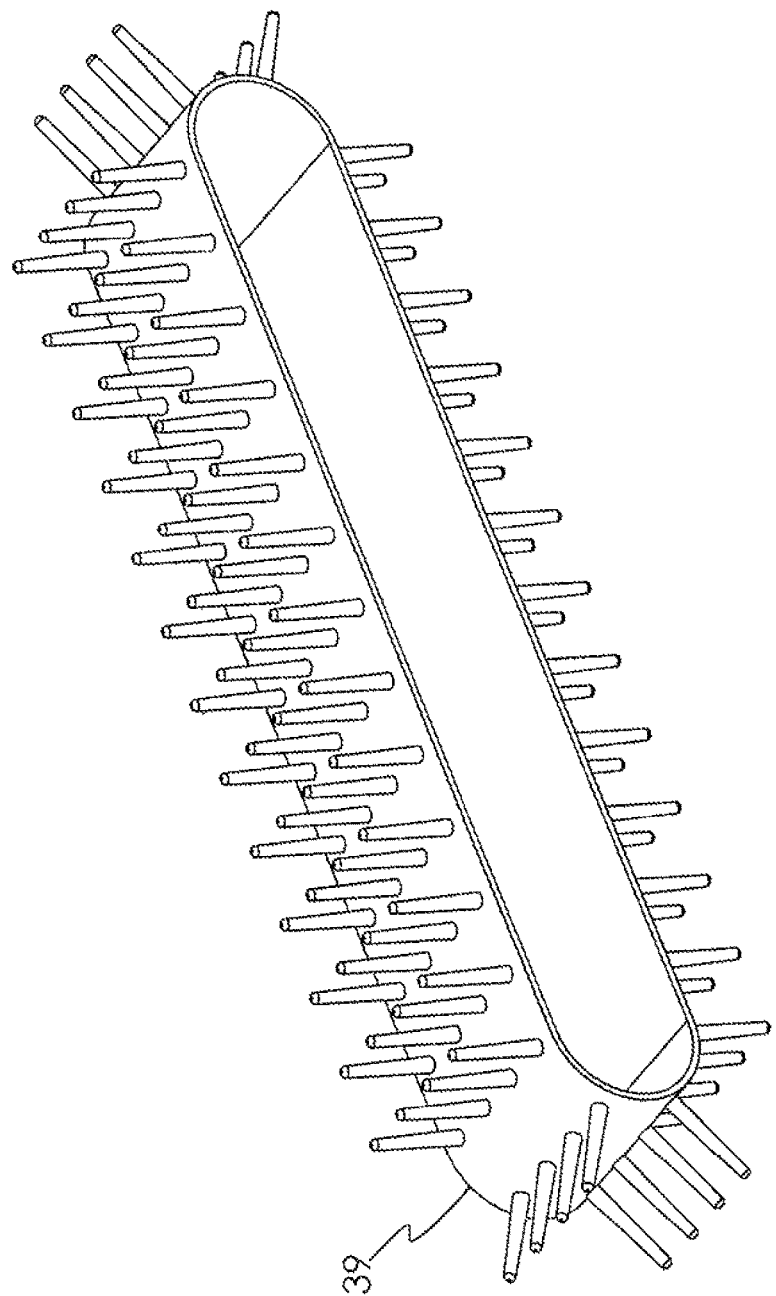
FIG. 5 is a side perspective view of a conventional egg finger belt.

The scratching floor 38 is oriented with respect to at least one belt 36. In one embodiment, the scratching floor 38 is planar with a belt 36 from which the scratching floor 38 extends. Alternatively, the scratching floor 38 is sloped to allow deposits to move back toward the belt 36, as shown in FIG. 4. The scratching floor 38 extends into the open space 20 of the aviary cage 10. The scratching floor 38 provides yet another pecking area for the hens to utilize while they are not nesting. In particular, the scratching floor 38 provides a scratching area for the birds within the cage 10. When the birds scratch the scratching floor 38, they scratch much of the deposits made on the scratching floor 38 onto the respective belt 36. Accordingly, since it is common for birds to defecate in their scratching area, the scratching floor 38 becomes relatively self-cleaning as the hens scratch. The scratching floor 38 is configured so that the deposits are scratched back to the respective belt 36. Such configuration greatly reduces the amount of ammonia captured within the cage 10 and also reduces the required frequency for cleaning of the aviary cage 10. Any eggs laid on the scratching floor 38 may be directed back toward the belt 36 by the scratching of the hens. These eggs are then collected on the belt 36 and removed from the belt 36. In one embodiment, the eggs are removed through the use of any conventional egg finger belt 39, shown in FIG. 5, positioned at the end of the belt 36.

It should be noted that the tower 18 illustrated includes two nesting areas 22 positioned in a stacked configuration. Each nesting area 22 may have its own belt 36 extending therebelow. Each belt 36 may be joined to a corresponding belt 36 of the adjacent tower 18 by a scratching floor 38. As will be appreciated by one of skill in the art, the configuration of the nesting areas 22, belts 36, and scratching floor 38 can be unstacked to have just one level of nesting areas 22, belts 36, and scratching floor 38 or can be repeated any number of times to create the desired number of levels in a stacked configuration within the aviary cage 10.

The present invention also provides a method of constructing an aviary cage 10 for deposit removal. The method includes positioning a belt 36 beneath a nesting area 22 to remove a deposit therefrom. A deposit may include, but is not limited to, manure, an egg, litter, feathers, feed, or a dead bird. In one embodiment, the belt 36 is configured to capture eggs laid outside of the nesting area 22. The method also includes extending a scratching floor 38 from the belt 36. In one embodiment, the scratching floor 38 is planar with the belt 36 from which the scratching floor 38 extends. In another embodiment, the scratching floor 38 is sloped toward the belt 36 to facilitate the movement of deposits, with or without the assistance of gravity, from the scratching floor 38 onto the belt 36. In one embodiment, the scratching floor 38 forms a scratching area for birds in the aviary cage 10. In one embodiment, the scratching area is configured for the birds to scratch manure on the scratching floor 38 onto the belt 36. In one embodiment, a belt 36 is also positioned along a top of the nesting area 22. In one embodiment, a belt 36 is also positioned along a floor 14 of the cage 10.

In one embodiment, the method includes positioning at least two nesting areas 22 in a stacked configuration. The method also includes extending a belt 36 below each nesting area 22. The method also includes extending a scratching floor 38 from a belt 36 to a corresponding belt 36 of an adjacent nesting area 22.

In one embodiment, the method includes positioning at least two nesting areas 22 in a stacked configuration. The method also includes extending a belt 36 below each nesting area 22. The method also includes extending a scratching floor 38 from each belt 36, but not making the scratching floor 38 extending from a belt 36 of a first nesting area 22 continuous with a scratching floor 38 extending from a corresponding belt 36 of an adjacent nesting area 22.

Figure 6:
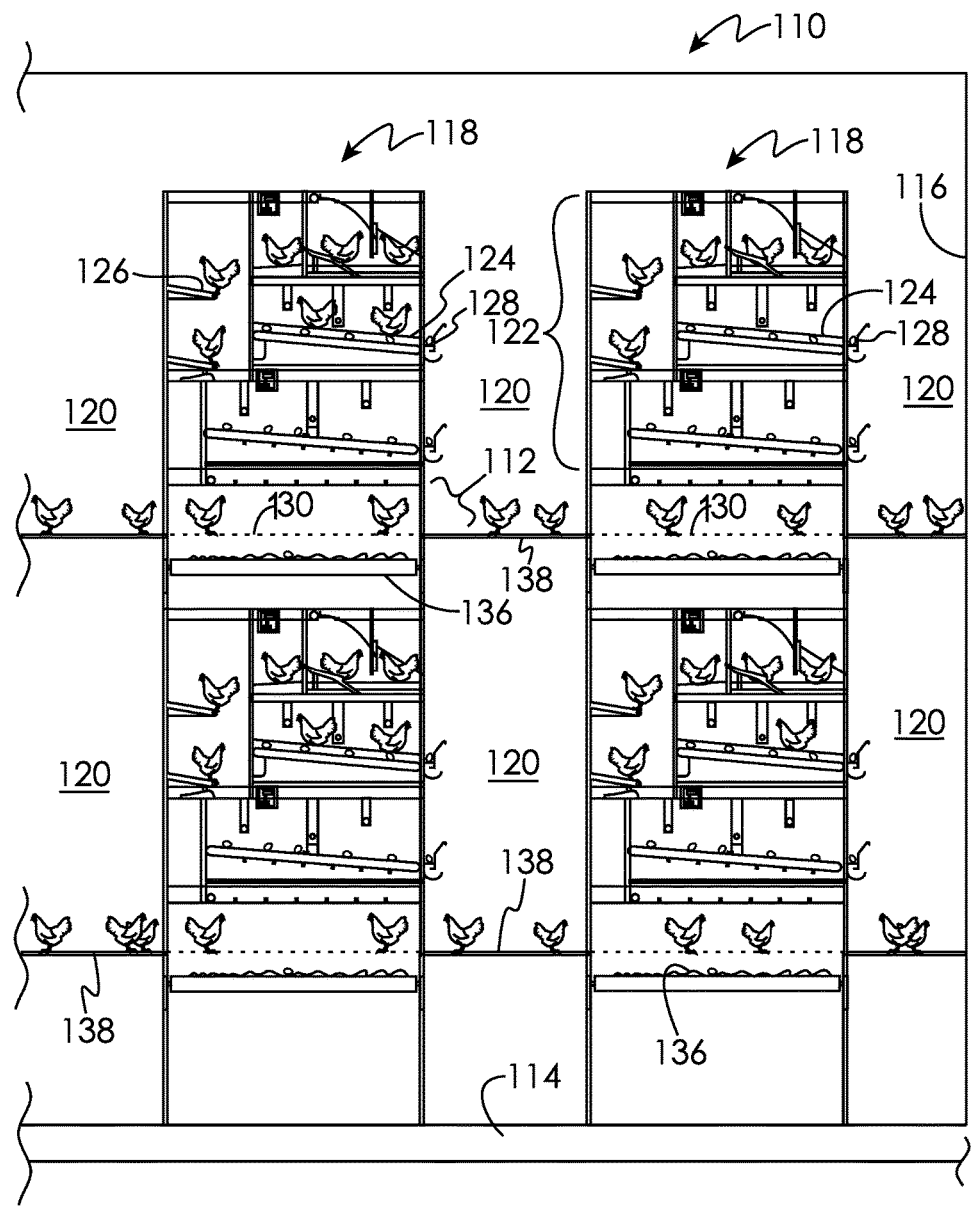
FIG. 6 is a front view of an aviary cage formed in accordance with another embodiment.
Figure 7:
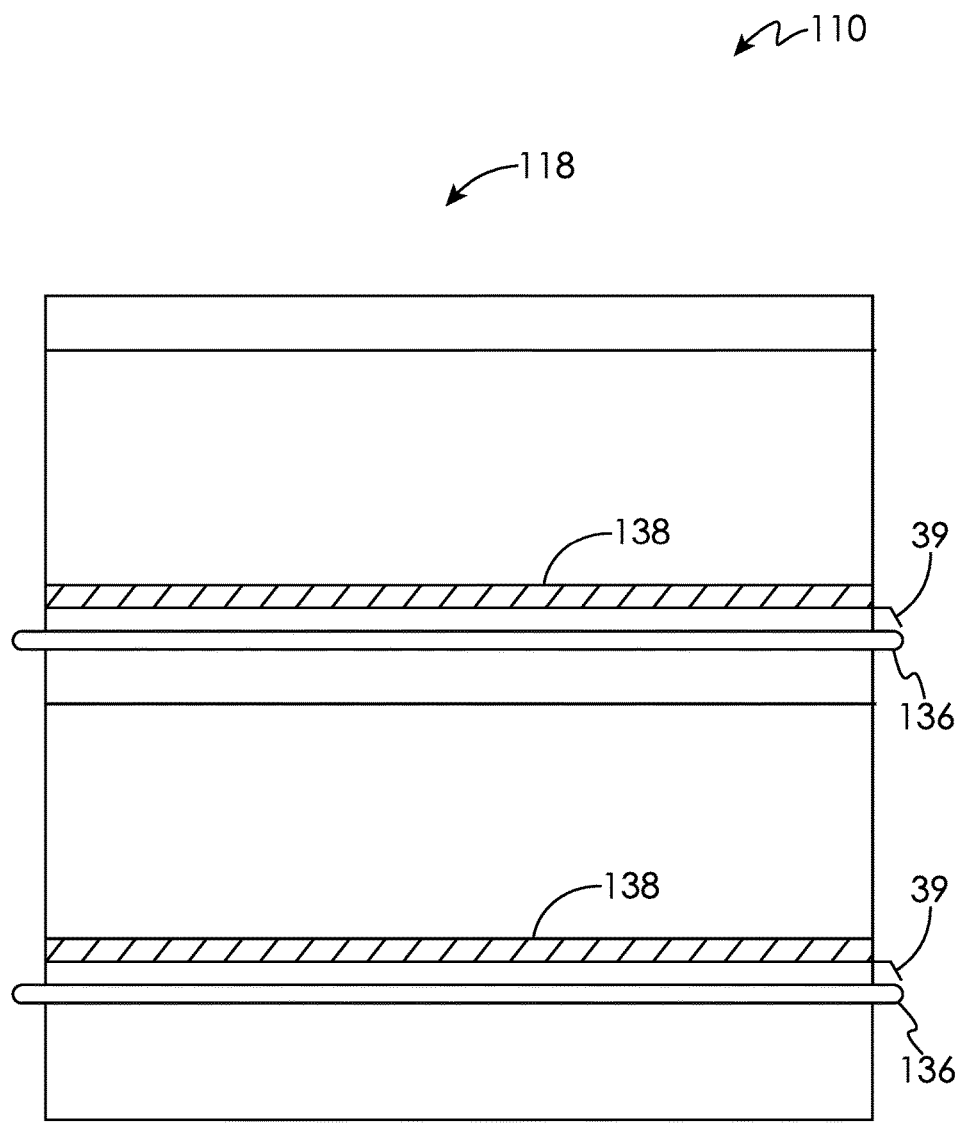
FIG. 7 is a side view of the aviary cage shown in FIG. 6 without the interior components of the cage towers.
Figure 8:
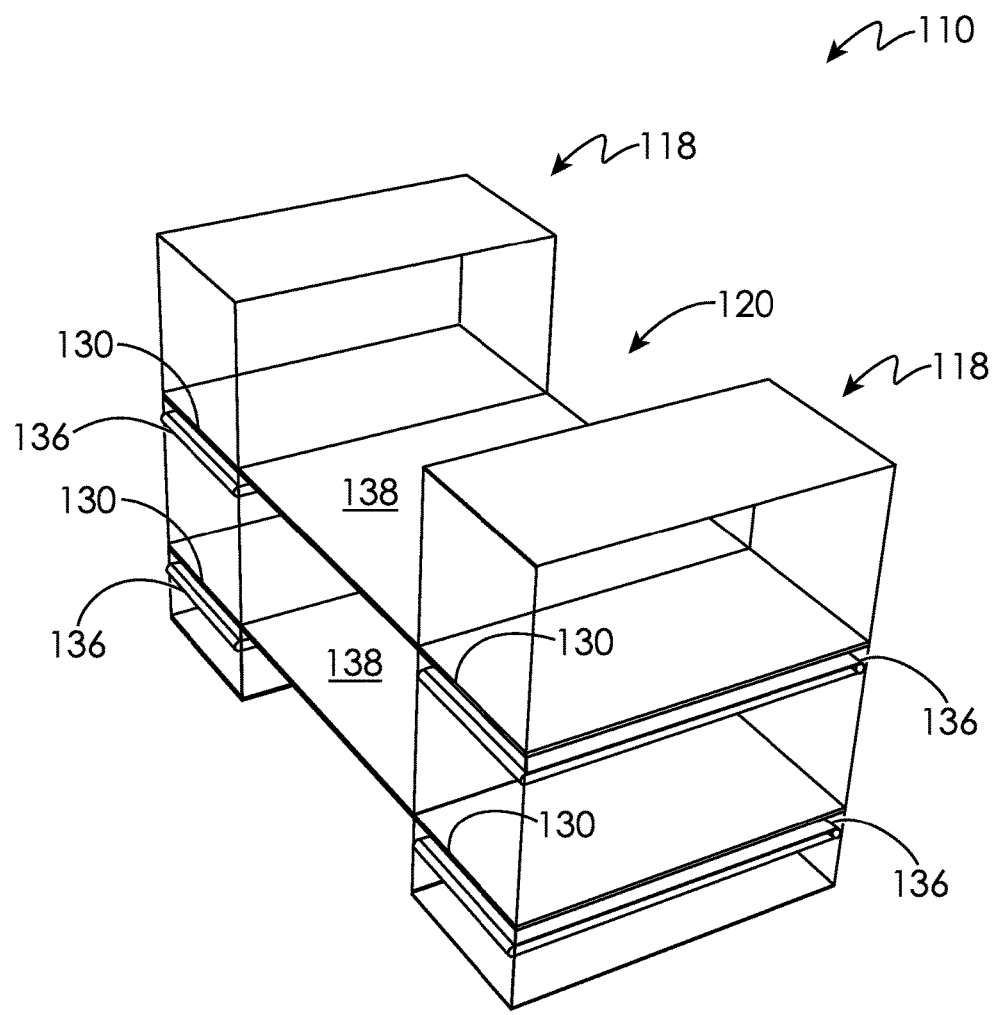
FIG. 8 is a top perspective view of the aviary cage shown in FIG. 6 without the interior components of the cage towers.

FIGS. 6-8 illustrate an aviary cage 110 configured with a manure removal system 112. The aviary cage 110 includes a concrete floor 114 enclosed by exterior walls 116. The exterior walls 116 enclose at least two cage towers 118 where hens are caged to lay eggs. Although the present embodiment illustrates only two towers 118, it should be noted that the aviary cage 110 may be constructed with any number of towers 118, including a single tower 118. An open space 120 extends between the two towers 118. In an embodiment having more than two towers 118, an open space 120 extends between each adjacent tower 118. In an embodiment having a single tower 118, an open space 120 is present on at least one side of the tower 118. Open space 120 is likewise positioned between the end towers 118 and the respective exterior wall 116.

Each tower 118 includes at least one nesting area 122. The nesting area 122, as illustrated, may include various nesting platforms 124 where the hen may sit to lay eggs. The nesting platforms 124 allow the hens to move freely up and down the tower 118 to a desirable nesting area 122. As the hens lay their eggs, the eggs are collected in egg conveyors 128 that extend along the sides of the nesting platforms 124. The egg conveyors 128 carry the eggs from the nesting area 122 to an egg collection area (not shown).

Figure 9:
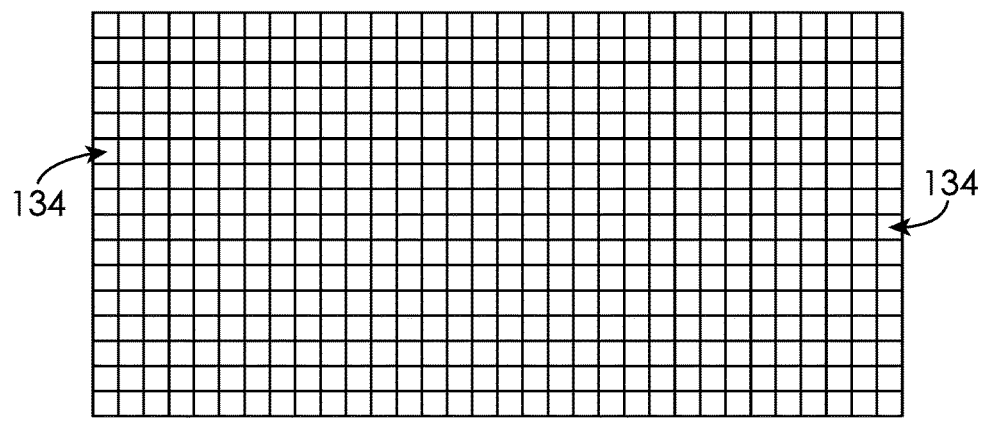
FIG. 9 is a top view of a mesh floor.

A mesh floor 130, as shown in FIG. 9, is positioned beneath each nesting area 122. In particular, the hens may leave the nesting area 122 and gather on the mesh floor 130. Like the open space 120, the mesh floor 130 provides an area for the hens to peck and scratch. The mesh floor 130 is formed from metal, plastic, or the like. The mesh floor 130 includes openings 134 therein that are sized to receive an egg therethrough, but are also spaced so as to support a hen. The openings 134 allow deposits such as, by way of example and not of limitation, manure, feed, litter, feathers, and eggs to pass therethrough.

A belt 136 extends below the mesh floor 130 to remove deposits that fall through openings 134 in the mesh floor 130. In one embodiment, the belt 136 extends along the length of the tower 118 and carries manure from the tower 118 to a collection area (not shown) positioned outside of the tower 118. Moreover, if a hen lays an egg outside of the nesting area 122 on the mesh floor 130, the egg is likewise collected by the belt 136 and carried to an egg collection area (not shown).

Figure 10:
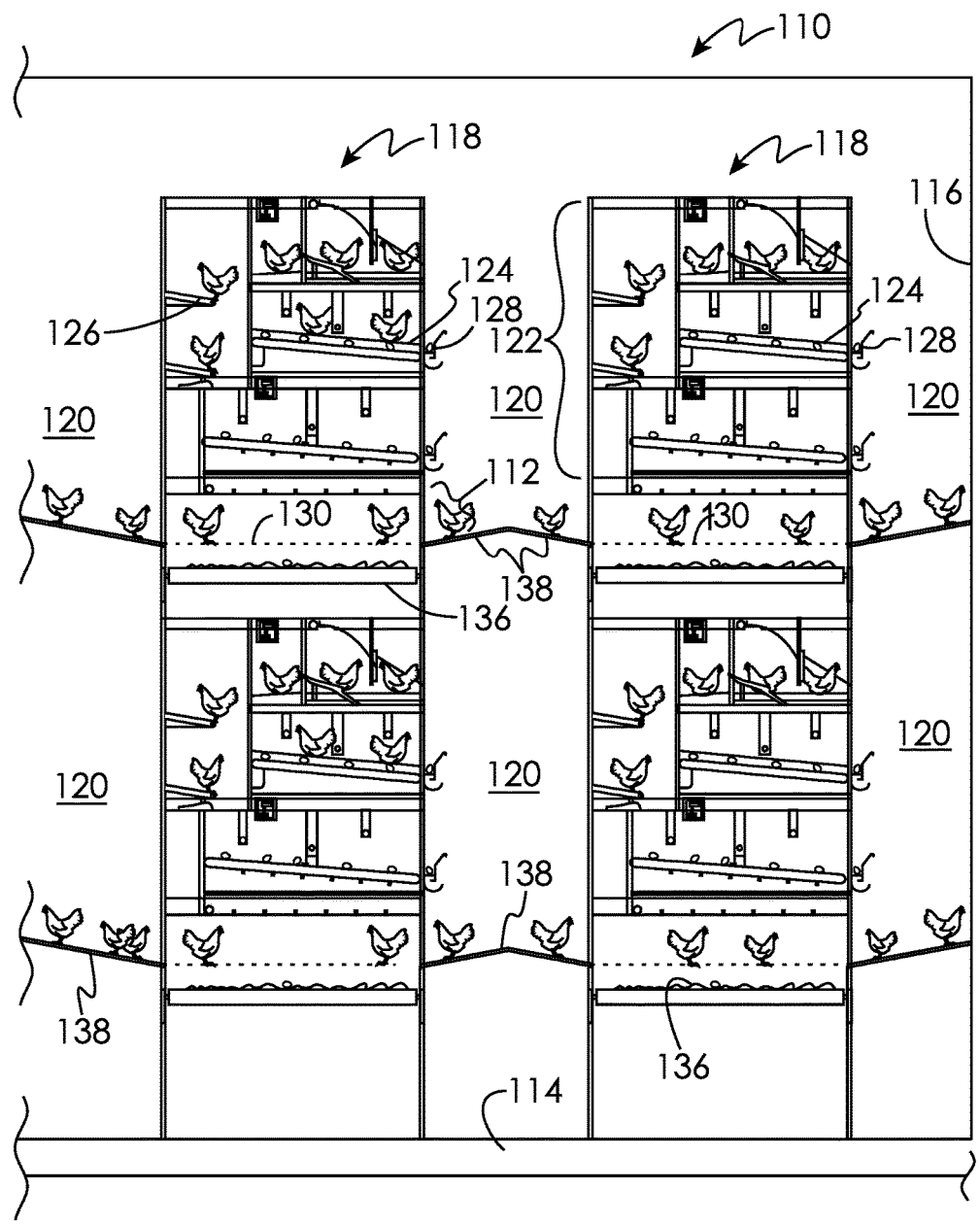
FIG. 10 is a front view of an aviary cage formed in accordance with another embodiment.

In the illustrated embodiment, a scratching floor 138 extends between the mesh floors 130 of the towers 118. In an embodiment having more than two towers 118, a scratching floor 138 may extend between any adjacent towers 118. In an embodiment having a single tower 118, a scratching floor 138 may extend from the tower 118. Additionally, a scratching floor 138 may extend between the end towers 118 and the respective exterior wall 116. In one embodiment, the scratching floor 138 is planar with the mesh floors 130 between which the scratching floor 138 extends. Alternatively, the scratching floor 138 may be sloped toward the mesh floor 130, as illustrated in FIG. 10. The scratching floor 138 extends into the open space 120 of the aviary cage 110.

The scratching floor 138 provides yet another pecking area for the hens to utilize while they are not nesting. In particular, the scratching floor 138 provides a scratching area for the hens to scratch and peck within the cage 110. When the birds scratch, they may scratch deposits on the scratching floor 138 through the mesh floor 130 and onto the belt 136. Accordingly, since it is common for birds to defecate in their scratching area, the scratching floor 138 becomes self-cleaning as the hens scratch. The scratching floor 138 is configured so that the deposits are scratched back to the mesh floor 130. Such configuration greatly reduces the amount of ammonia captured within the cage 110 while also reducing the requirement for frequent cleaning of the aviary cage 110. Any eggs laid on the scratching floor 138 may be directed back toward the mesh floor 130 by the scratching of the hens. These eggs are then collected on the belt 136 and removed from the belt 136. In one embodiment, the eggs are removed through the use of any conventional egg finger belt 39, shown in FIG. 5, positioned at the end of the belt 136.

It should be noted that the towers 118 illustrated each include two nesting areas 122 positioned in a stacked configuration. Each nesting area 122 has its own mesh floor 130 and belt 136 extending therebelow. Each mesh floor 130 is joined to a corresponding mesh floor 130 of the adjacent tower 118 by a scratching floor 138. As will be appreciated by one of skill in the art, the configuration of the nesting areas 122, mesh floors 130, belts 136, and scratching floors 138 can be repeated any number of times in a stacked configuration within the aviary cage 110.

The present invention also provides a method of constructing an aviary cage 110 to facilitate deposit removal. The method includes positioning a mesh floor 130 beneath a nesting area 122. The method also includes positioning a belt 136 below the mesh floor 130 to remove deposits that fall through openings 134 in the mesh floor 130. In one embodiment, the belt 136 is configured to capture eggs laid outside of the nesting area 122. The method also includes extending a scratching floor 138 from the mesh floor 130 to a mesh floor 130 of an adjacent nesting area 122. In one embodiment, the scratching floor 138 is planar with the mesh floors 130 between which the scratching floor 138 extends. Alternatively, the scratching floor 138 can be sloped toward the mesh floor 130. In one embodiment, the scratching floor 138 forms a scratching area for birds in the aviary cage 110. In one embodiment, the scratching area is configured for the birds to scratch deposits on the scratching floor 138 from the scratching floor 138 to the mesh floor 130 and through the mesh floor 130 to the belt 136.

In one embodiment, the method includes positioning at least two nesting areas 122 in a stacked configuration. The method also includes extending a mesh floor 130 and belt 136 below each nesting area 122. The method also includes joining each mesh floor 130 to a corresponding mesh floor 130 of an adjacent nesting area 122 by a scratching floor 138.

The systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. An aviary cage operatively disposed upon an aviary floor, the aviary cage comprising:
a tower comprising:
a nesting area positioned in the tower;
a belt positioned below the nesting area; and
a scratching platform spaced vertically apart from the aviary floor and extending outwardly from the tower adjacent to the belt.

2. The aviary cage of claim 1, wherein the scratching platform extends from the tower planar to the belt.

3. The aviary cage of claim 1, wherein the scratching platform comprises a solid floor.

4. The aviary cage of claim 1, wherein the scratching platform is sloped to facilitate movement of a deposit on the scratching platform to the belt.

5. The aviary cage of claim 1, wherein the belt is operative to remove a deposit from at least part of the tower.

6. The aviary cage of claim 5 further comprising a gate positioned in relation to the belt to prevent animals from leaving said at least part of the tower.

7. The aviary cage of claim 1, wherein the belt is configured for animals to walk thereon.

8. The aviary cage of claim 1, wherein the scratching platform is configured to transport eggs and manure deposited thereon onto the belt for removal.

9. The aviary cage of claim 1, wherein:
the nesting area comprises:
a first nesting area; and
a second nesting area; and
the belt comprises:
a first belt; and
a second belt;
wherein the first nesting area and the second nesting area are positioned in a stacked configuration in the tower; and
wherein the first belt is positioned below the first nesting area; and
wherein the second belt is positioned below the second nesting area; and
wherein the scratching platform extends from the tower adjacent to one of the first belt and the second belt.

10. The aviary cage of claim 9, wherein the scratching platform comprises:
a first scratching platform; and
a second scratching platform;
wherein the first scratching platform extends from the tower adjacent the first belt;
wherein the second scratching platform extends from the tower adjacent the second belt;
wherein a deposit on the first scratching platform may be directed to the first belt; and
wherein a deposit on the second scratching platform may be directed to the second belt.

11. The aviary cage of claim 1, wherein:
the belt comprises:
a first belt; and
a second belt; and
wherein the scratching platform extends from the tower adjacent to one of the first belt and the second belt.

12. The aviary cage of claim 1, further comprising a mesh floor, wherein the mesh floor is positioned above the belt.

13. The aviary cage of claim 12, wherein the mesh floor is coplanar with the scratching platform.

14. An aviary cage operatively disposed upon an aviary floor, the aviary cage comprising:
a nesting area;
a belt positioned below the nesting area; and
a scratching platform spaced vertically apart from the aviary floor, and positioned adjacent to the belt and extending outwardly from the belt.

15. The aviary cage of claim 14, wherein the scratching platform is positioned in a planar orientation with the belt.

16. The aviary cage of claim 14, wherein the scratching platform is sloped to facilitate movement of deposits from the scratching platform to the belt.

17. The aviary cage of claim 14, wherein the belt removes a deposit from at least part of the tower of the aviary cage.

18. The aviary cage of claim 14, wherein the belt is configured for animals to walk thereon.

19. The aviary cage of claim 14, wherein the scratching platform is configured to transport eggs and manure deposited thereon onto the belt for removal.

20. A method of constructing an aviary cage for deposit removal, the aviary operatively disposed upon an aviary floor, the method comprising:
providing a tower having a nesting area therein;
positioning at least one belt below said nesting area; and
positioning at least one scratching platform adjacent to the at least one belt, extending outwardly from an interior of the tower and spaced vertically apart from the aviary floor.

21. The method of claim 20 further comprising:
configuring the at least one belt to capture manure; and
configuring the at least one belt to remove a dead animal from the tower of the aviary cage.

22. The method of claim 20, wherein positioning at least one scratching platform adjacent to the at least one belt comprises positioning at least one solid floor adjacent to the at least one belt.

23. The method of claim 20 further comprising sloping said at least one scratching platform to facilitate movement of a deposit on the at least one scratching platform from the at least one scratching platform to the at least one belt.

24. The method of claim 20 further comprising configuring the at least one belt for animals to walk thereon.

25. The method of claim 24 further comprising positioning a gate in relation to the at least one belt to prevent animals from leaving at least part of the tower.

26. An aviary cage operatively disposed upon an aviary floor, the aviary cage comprising:
a tower;
a belt positioned in the tower; and
a scratching floor spaced apart from the aviary floor and extending from the tower adjacent to the belt, wherein the scratching floor is sloped to facilitate movement of a deposit on the scratching floor to the belt.

27. The aviary cage of claim 26, further comprising a mesh floor, wherein the mesh floor is positioned above the belt, and further wherein the scratching floor extends from the tower adjacent to the mesh floor.

28. An aviary cage operatively disposed upon an aviary floor, the aviary cage comprising:
a tower comprising:
a belt positioned in the tower; and
a scratching platform spaced vertically apart from the aviary floor and extending outwardly from the tower adjacent to the belt.

29. The aviary cage of claim 28, wherein the scratching platform extends from the tower planar to the belt.

30. The aviary cage of claim 28, wherein the scratching platform comprises a solid floor.

31. The aviary cage of claim 28, wherein the scratching platform is sloped to facilitate movement of a deposit on the scratching platform to the belt.

32. The aviary cage of claim 28, wherein the belt is operative to remove a deposit from at least part of the tower.

33. The aviary cage of claim 32, further comprising a gate positioned in relation to the belt to prevent animals from leaving said at least part of the tower.

34. The aviary cage of claim 28, wherein the belt is configured for animals to walk thereon.

35. The aviary cage of claim 28, wherein the scratching platform is configured to transport eggs and manure deposited thereon onto the belt for removal.

36. The aviary cage of claim 28, further comprising:
a nesting area comprising:
a first nesting area; and
a second nesting area; and
wherein the belt comprises:
a first belt; and
a second belt;
wherein the first nesting area and the second nesting area are positioned in a stacked configuration in the tower; and
wherein the first belt is positioned below the first nesting area; and
wherein the second belt is positioned below the second nesting area; and
wherein the scratching platform extends from the tower adjacent to one of the first belt and the second belt.

37. The aviary cage of claim 36, wherein the scratching platform comprises:
a first scratching platform; and
a second scratching platform;
wherein the first scratching platform extends from the tower adjacent the first belt;
wherein the second scratching platform extends from the tower adjacent the second belt;
wherein a deposit on the first scratching platform may be directed to the first belt; and
wherein a deposit on the second scratching platform may be directed to the second belt.

38. The aviary cage of claim 28, wherein:
the belt comprises:
a first belt; and
a second belt; and
wherein the scratching platform extends from the tower adjacent to at least one of the first belt and the second belt.

* * * * *